United States Patent [19]

Whitlock

[11] 3,950,646

[45] Apr. 13, 1976

[54] PORTABLE APPARATUS FOR MEASUREMENT OF NUCLEAR RADIATION

[76] Inventor: Gerald David Whitlock, 18, Pixiefields, Cradley, Malvern, Worcestershire, England

[22] Filed: Dec. 6, 1974

[21] Appl. No.: 530,080

[52] U.S. Cl. ............................. 250/361; 250/308
[51] Int. Cl.² ........................................ G01T 1/20
[58] Field of Search ............ 250/308, 361, 362, 363, 250/364, 367, 368

[56] References Cited
UNITED STATES PATENTS

| | | | |
|---|---|---|---|
| 2,841,715 | 7/1958 | Schultz | 250/368 |
| 2,945,955 | 7/1960 | Mossop et al. | 250/361 |
| 3,056,886 | 10/1962 | Glaude et al. | 250/364 |
| 3,189,742 | 6/1965 | Leuba | 250/364 |

*Primary Examiner*—Archie R. Borchelt
*Attorney, Agent, or Firm*—Prutzman, Hayes, Kalb & Chilton

[57] ABSTRACT

A portable apparatus for measurement of nuclear radiation, particularly beta particle radiation due to contamination, of a worktop or bench, comprises a plastic scintillator sheet mounted in the base of a housing, a photomultiplier within the housing, optically coupled to the plastic scintillator sheet, and a rate-motor or counter connected to the photo-multiplier. A pump is also provided, to reduce pressure between the work surface and the plastic scintillator sheet to substantially below atmospheric pressure, so as to increase the mean range of the radiation. Accordingly, the base of the housing is also fitted with a sealing ring.

15 Claims, 3 Drawing Figures

PORTABLE APPARATUS FOR MEASUREMENT OF NUCLEAR RADIATION

FIELD OF THE INVENTION

This invention relates to a portable apparatus for measurement of nuclear radiation.

A particular application of the invention is to measurement of radioisotope-contamination, for example, tritium ($H^3$)-contamination, of a surface.

BACKGROUND OF THE INVENTION

The maximum energy of a tritium beta particle is only 18.5 Kev, so that its maximum range in air at normal atmospheric pressure is only 1.5 mm. Furthermore, when monitoring such radiation it is necessary to exclude all light.

It is an object of the invention in its preferred form to provide a portable apparatus for measurement of nuclear radiation which is easy for a worker in the radioactivity art to use for measuring tritium contamination of a surface area, article or quantity of matter. However, the invention may have application having nothing to do with this object.

SUMMARY OF THE INVENTION

According to the invention there is provided a portable apparatus for measurement of nuclear radiation, comprising a plastic scintillator sheet arranged in a base of a housing for detection of nuclear radiation, a sealing ring mounted in the base of the housing to make a substantially hermetic and light-tight seal between a support surface and the base of the housing, photomultiplier means optically coupled to the scintillator sheet to detect and amplify scintillations of the sheet, and a device to reduce air pressure in the region of the sheet to substantially below atmospheric pressure.

The invention will now be described by way of example with reference to the accompanying drawings.

IN THE DRAWINGS

DESCRIPTION OF THE PREFERRED EMBODIMENTS

Figure 1:
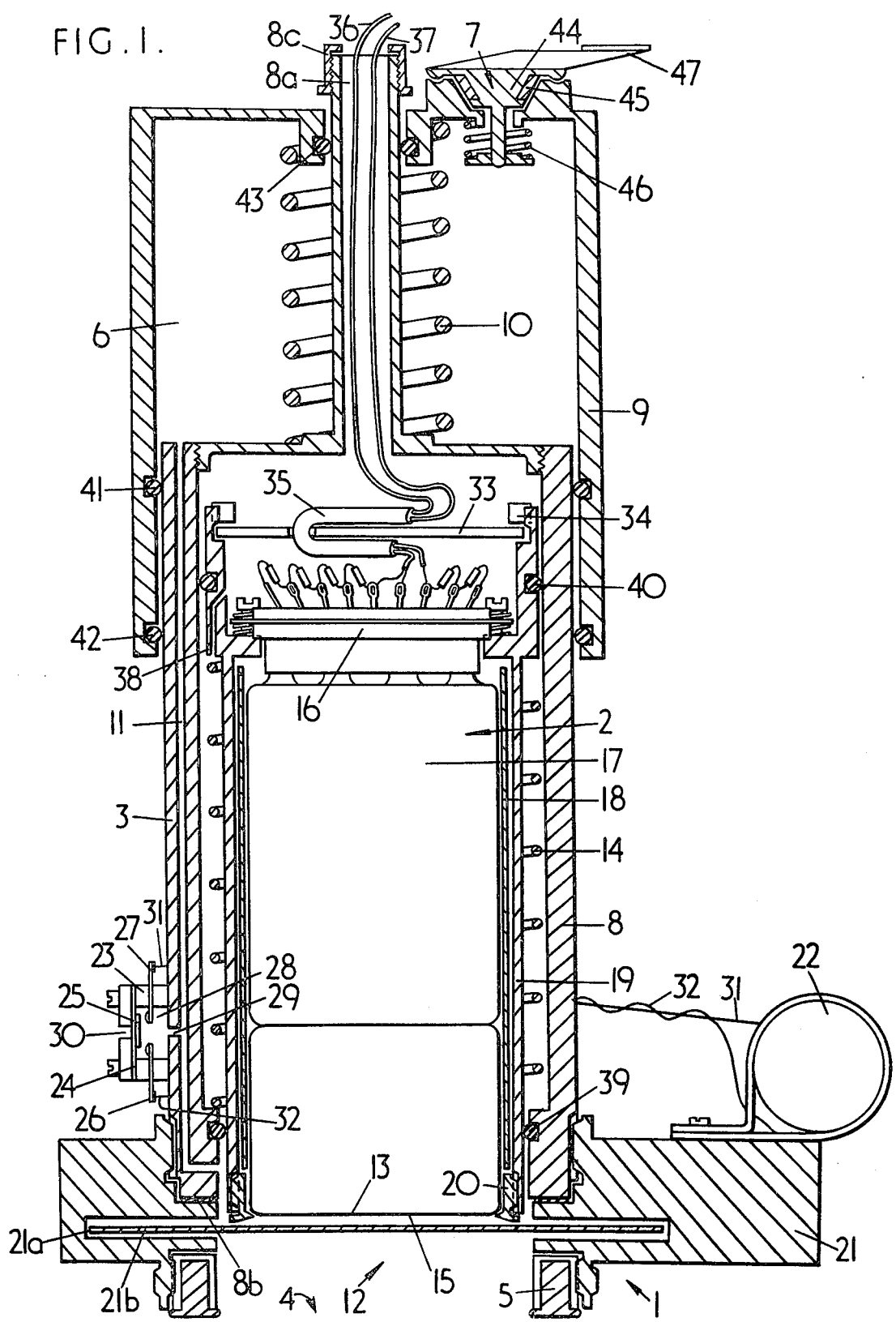
FIG. 1 illustrates a section through a first portable apparatus for measurement of nuclear radiation in accordance with the invention (the above-mentioned form of the invention)

The portable apparatus 1 for measurement of nuclear radiation illustrated in FIGS. 1 and 2 comprises a radiation detector 2 arranged within a housing 3 so that the detector 2 can detect nuclear radiation from a surface area not shown, in a manner described hereinafter when an opening 4 of the housing 3 is applied to a ring-form support surface, not shown, surrounding said surface area. The opening 4 of the housing 3 is bounded by an opaque resilient sealing ring 5 of rubber to make a light-tight and hermetic seal with the ring-form support surface.

The ring-form support surface must be smooth and impervious to light. The surface area which it surrounds must also be impervious to light.

The apparatus 1 includes a variable volume chamber 6 and a pressure-relief non-return valve 7. The chamber 6 is formed between two portions 8 and 9 of the housing 3, the housing portion 8 being telescopically slidable within the housing portion 9. When the apparatus 1 is placed with the opening 4 upon the surface, the chamber volume can be reduced by hand pressure upon the (upper) housing portion 9 causing the housing portion 8 to telescope into housing portion 9 and air to be driven out of the chamber 6 through the valve 7. a compression spring 10 is arranged to act between the housing portions 8 and 9 to raise the housing portion 9 again after removal of the hand pressure, thereby causing the volume of the chamber 6 to be increased again, thus causing a reduction of pressure in the chamber 6. The chamber 6 communicates via a passage or duct 11 with a space 12 which exists in use between a sheet-form plastic scintillator 13, (Type NE 102 A made by Nuclear Enterprises (GB) Ltd,) of the radiation detector 2 and the surface, so that the pressure in the space 12 is also reduced.

The radiation detector 2 is in the form of a unit which is movable within the housing 3 towards and away from the housing opening 4 and is urged by a spring 14 away from the opening 4. The lower end 15 of the detector 2 is subjected to the pressure in the space 12. The upper end 16 of the detector 2 is subjected to atmospheric pressure via a passage or duct 8a extending from the lower housing portion 8 through the top of the upper housing portion 9. Thus, when the pressure in the space 12 is reduced, the detector 2 is moved down under atmospheric pressure, against the spring 14, towards the opening 4. When monitoring radiation on a surface, the detector 2 abuts the surface.

The detector 2 comprises the sheet-form plastics scintillator 13 and a photo-multiplier device 17, (Type 9750 QB made by E.M.I. Ltd.) enclosed in a mumetal shield 18, (Type PS5 B made by E.M.I. Ltd,) and a casing 19, as well as a retaining ring 20 of polytetrafluorethylene which retains the scintillator 13 and photomultiplier device 17 in the casing 19, insulates the photomultiplier 17 from casing 19 and also spaces the scintillator 13 from the surface in use by a predetermined amount. The photomultiplier device 17 has 19 terminals 17a, some of which are shown, including terminals for cathode, ten dynodes and anode (not shown) of the device 17.

Two co-axial conductor pairs 36 and 37 are connected by soldering as follows:- the outer conductors of both conductor pairs to the cathode terminal and to earth; the centreconductor of conductor pair 36 to a junction between an adjustable anode load resistor and a 100 kilohm resistor connected (by soldering) in series between terminals (namely, the anode and tenth dynode terminals), of device 17 and to a high voltage supply 48; (the anode load resistor is adjusted so that the dynode chain current is ten times the mean anode current;) (FIG. 2) and the centre conductor of conductor pair 37 through a coupling capacitor to the anode terminal and to an amplifier 49 (FIG. 2).

A dynode chain of a zener diode, resistors and capacitors, some of which are illustrated diagrammatically, is connected by soldering to various terminals as follows:- a zener diode type 154150 between the cathode and first dynode; nine resistors, each 100 kilohms, between the respective pairs of the first to ninth dynodes in sequence and between the tenth dynode and the high voltage; a resistor of 200 kilohms between the ninth and tenth dynodes; three capacitors of 0.001 μF, 0.001 μF and 0.01 μF respectively between the seventh and eighth, the eighth and ninth and the ninth and tenth dynodes, in parallel with the respective resistors; a capacitor of 0.05 μF between the tenth dynode and the (earthed) cathode; and an anode load resistor between the high voltage and the anode.

A shutter assembly 21 forms part of the housing 3 and is arranged to prevent exposure of the radiation detector 2 to light. More particularly, the shutter 21 assembly is an electrically operable shutter, (Type Cn-1733-000 "Compur" shutter obtainable from George Elliott & Sons, Ltd, or COMPUR-WERK G.m.b.H. & Co, of 8 Munich 25, Steinerstrasse 15, West Germany, with its own electrical supply battery 22, and acts when closed to stop the detector 2 from moving through the shutter 21. (There is an air passage, a continuation of passage 11, around the outside edges 21a of the shutter proper 21b, so that pressures above and below the shutter proper 21b are equal).

A pressure-responsive electrical contact device 23 is mounted on the lower housing part 8 and comprises a rubber diaphragm 24 carrying a movable electrical contact 25 which is engageable with two fixed electrical contacts 26 and 27 in a chamber 28 which communicates through a passage 29 with the passage 11. When the pressure in the chamber 6 and the space 12 is reduced sufficiently, atmospheric pressure acting through an opening 30 moves contact 25 into engagement with contacts 26 and 27, which are connected by wires 31 and 32 electrically in series with the battery 22 and a solenoid, not shown, of the shutter 21, so that the shutter is opened, and the detector 2 is permitted to move down through the shutter 21 under atmospheric pressure until the detector 2 abuts the surface, initiating exposure of the detector 2 to the radiation, (the above-mentioned beta particle radiation).

Features of the radiation detector 2 not mentioned so far are:- a light-tight partition 33 retained in the screw-threaded top of the casing 19 by a screw-threaded ring 34 which is screwed into the top of the casing 19; a U-shaped light-excluding duct 35 in the partition 33 for electrical conductors 36 and 37 from the photomultiplier device 17 to be extended to the exterior of the apparatus 1 through the duct 8a; a passage 38 interconnecting the space occupied by the spring 14 with the atmosphere to avoid an air-lock; and two elastomeric O-rings 39 and 40 to provide an hermetic seal between the casing 19 and the housing part 8.

There are two further elastomeric O-rings 41 and 42 providing an hermetic seal between the housing parts 8 and 9, also a rubber seal 8b between housing portion 8 and shutter assembly 21, as well as an elastomeric O-ring 43 between the housing part 9 and the duct 8a. A retaining nut 8c is screwed onto the duct 8a to retain the housing portion 9 on the housing portion 8.

The valve 7 comprises a part-frusto-conical body 44, a sealing washer 45, a spring 46 and a lever 47 for opening the valve 7, to release the partial vacuum in the chamber 6 and space 12 and thus permit removal of the apparatus 1 from the support surface, when monitoring is completed. When the vacuum is being released, the detector 2 retracts upwardly, due to spring 14 and, upon opening of contacts 25 to 27, the shutter 21 closes under spring action.

The bottom surface of the sealing ring 5 may advantageously be slightly frusto-conical, (narrowing upwardly), to provide a good seal.

Figure 2:
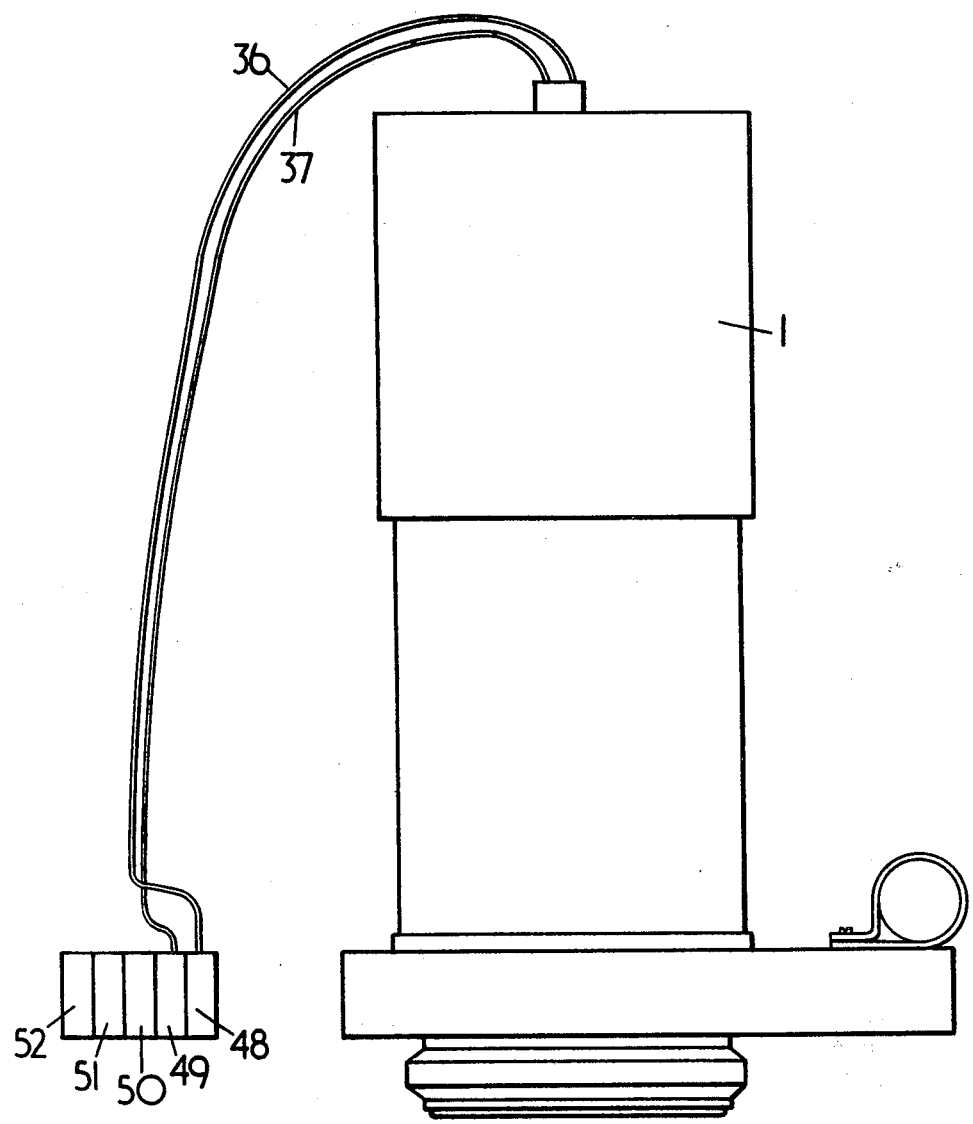
FIG. 2 shows the apparatus of FIG. 1 connected to a voltage supply, amplifier, pulse height discriminator, rate-meter and scaler.

Referring to FIG. 2, the conductors 36 and 37 are connected to high voltage supply 48, amplifier 49, a pulse height discriminator 50, a rate-meter 51 and a scaler 52.

The voltage supply 48, amplifier 49, pulse height discriminator 50 and rate-meter 51 are all included in a portable rate-meter spectrometer Type NE 8433 made by Nuclear Enterprises (GB) Ltd.

Figure 3:
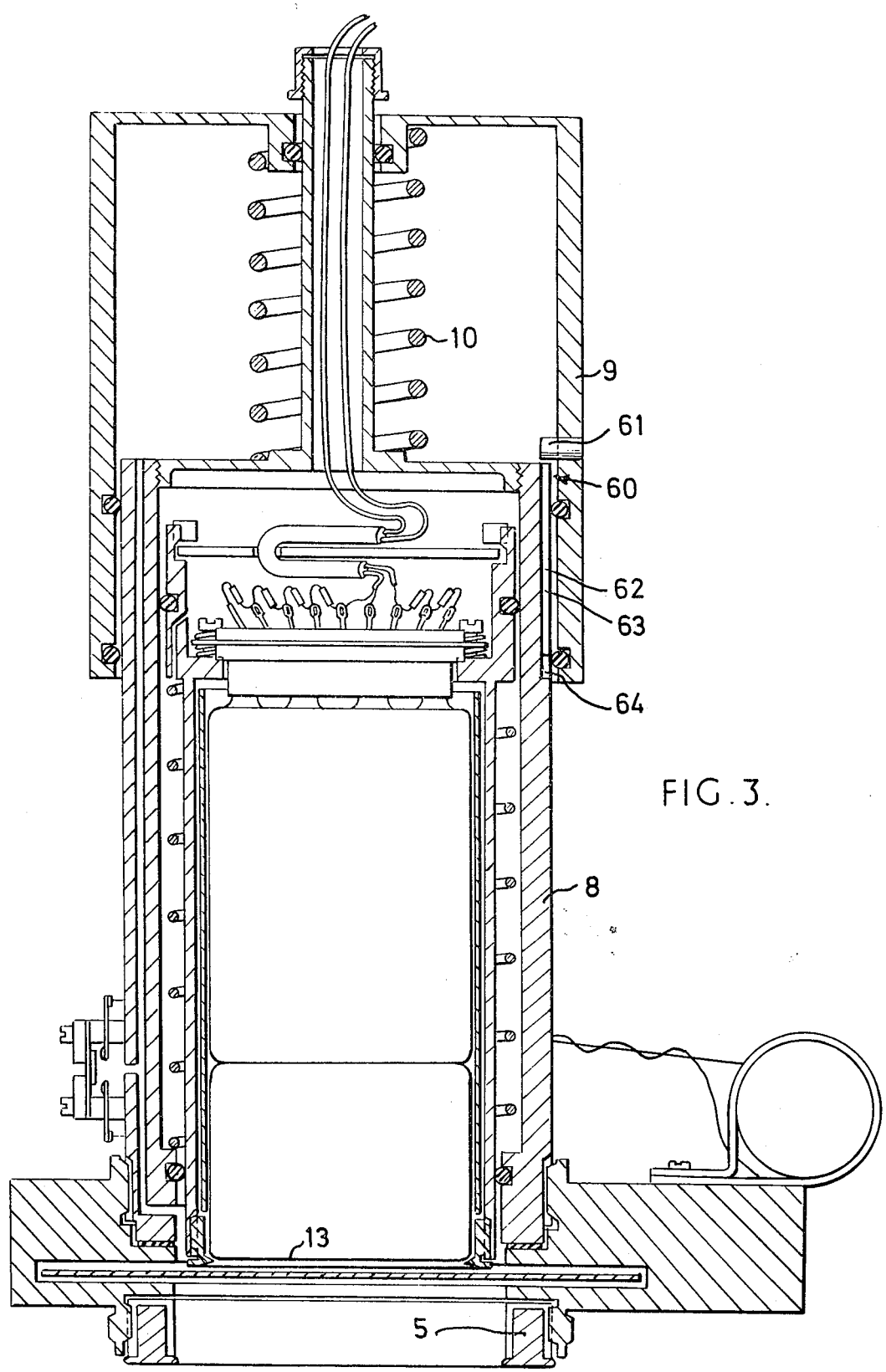
FIG. 3 illustrates a section through a second portable apparatus in accordance with the invention.

The portable apparatus illustrated in FIG. 3 for measurement of nuclear radiation is identical to the apparatus of FIGS. 1 and 2 except for two differences.

One of these differences is the provision of a latch 60 for selectively holding housing portions 8 and 9 telescoped one into the other with spring 10 compressed. The latch 60 takes the form of a projecting pin 61 on housing portion 9 engaging in a recess in the form of a groove 62 in housing portion 8. The groove 62 has a vertical portion 63 and has a horizontal portion 64 at the bottom of the vertical portion 63.

The latch 60 is adapted to be operable by pressing housing portion 9 down over housing portion 8, compressing spring 10, until the pin 61 reaches the bottom of the vertical groove portion 63, thereby compressing spring 10, and then rotating housing portion 9 to move pin 61 into the horizontal groove portion 64, in which position the latch 60 holds housing portions 8 and 9 telescoped together.

In this condition, (that is, with housing portions 8 and 9 telescoped together,) the apparatus is, in use, placed on a working surface (not shown) believed to be contaminated with radioactive material, so that the sealing ring 5 makes good contact with the working surface. Then the latch 10 is released by rotating housing portion 9 in the opposite direction and releasing it so that the compressed spring 10 pushes housing portion upwardly to expand the chamber 6 and hence to reduce air pressure in chamber 6 and in the region of the scintillator sheet 13 to substantially below atmospheric pressure, for a measurement to be made.

After the measurement, the housing portion 9 is again pressed down, and the latch 60 is engaged, to restore the pressure in chamber 6, whereupon the apparatus can be readily moved to another position.

It will be apparent that there is no need of a pressure-relief valve such as the valve 7 in FIGS. 1 and 2, this being the other one of the two differences mentioned above.

I claim:

1. A portable apparatus for measurement of nuclear radiation, comprising a plastic scintillator sheet arranged in a base of a housing for detection of nuclear radiation, a sealing ring mounted in the base of the housing to make a substantially hermetic and light-tight seal between a support surface and the base of the housing, photo-multiplier means optically coupled to the scintillator sheet to detect and amplify scintillations of the sheet, and a device to reduce air pressure in the region of the sheet to substantially below atmospheric pressure.

2. Apparatus as claimed in claim 1 wherein the said device is a pump formed by the housing, one portion of which is telescopically slidable within another portion thereof.

3. Apparatus as claimed in claim 2 and further comprising a spring arranged to act between the two housing portions in a sense such as to increase the effective volume of the housing and hence to reduce the pressure therein.

4. Apparatus as claimed in claim 1 and further comprising pressure-relief non-return valve adapted and arranged to vent air from the apparatus.

5. Apparatus as claimed in claim 1 and further comprising a spring, wherein the scintillator sheet and photomultiplier means are movable as one unit within the housing, the unit being arranged to be acted upon by atmospheric pressure to move the unit into an operative position against said spring when the air pressure in the region of the sheet is reduced to substantially below atmospheric pressure.

6. Apparatus as claimed in claim 5 wherein the unit is adapted to abut the support surface.

7. Apparatus as claimed in claim 1 wherein the scintillator sheet is arranged to be spaced from the support surface by a predetermined amount.

8. Apparatus as claimed in claim 1 and further comprising a shutter arranged to prevent exposure of the scintillator sheet to light when the apparatus is not in use.

9. Apparatus as claimed in claim 8 and further comprising a pressure-responsive device arranged to open the shutter in response to the reduction of air pressure in the region of the scintillator sheet to substantially below atmospheric pressure.

10. Apparatus as claimed in claim 9 wherein the pressure-responsive device is an electrical contact device.

11. Apparatus as claimed in claim 1 wherein the said device comprises a variable volume chamber, the device being manually operable to reduce the volume of the chamber, and further comprising a selectively releasable latch to latch the device in its reduced volume condition and a spring to increase the volume of the chamber and hence to reduce the air pressure in the region of the sheet when the latch is released.

12. Apparatus as claimed in claim 11, wherein the device is formed by the housing, one portion of which is telescopically slidable within another portion thereof.

13. Apparatus as claimed in claim 12, wherein the latch is formed by a projection of one housing portion engageable in a recess of the other housing portion.

14. Apparatus as claimed in claim 1, wherein the device is a rolling diaphragm pump.

15. Apparatus as claimed in claim 14, wherein the pump is lever-operated.

* * * * *